United States Patent [19]

Hörmann et al.

[11] 4,126,820

[45] Nov. 21, 1978

[54] LOWERABLE ANTENNA FOR RADIO RECEIVERS

[75] Inventors: Bernt O. Hörmann; Egon Frey, both of Sindelfingen, Germany

[73] Assignee: Daimler-Benz Aktiengesellschaft, Germany

[21] Appl. No.: 830,665

[22] Filed: Sep. 6, 1977

[30] Foreign Application Priority Data

Sep. 11, 1976 [DE] Fed. Rep. of Germany ....... 2641071

[51] Int. Cl.² ............ H02H 7/08

[52] U.S. Cl. ............ 318/468

[58] Field of Search ............ 343/715, 714, 901, 903; 318/467, 673, 468, 470

[56] References Cited

U.S. PATENT DOCUMENTS 2,650,302 8/1953 Geyer .............. 318/468 X 2,949,608 8/1960 Fischer .............. 318/468

*Primary Examiner*—Herman Hohauser

*Attorney, Agent, or Firm*—Craig & Antonelli

[57] ABSTRACT

An antenna adapted to be extended and retracted for car radio receivers, which is actuated by means of an on-off switch of the radio receiver and is driven by an electric motor reversible in its direction of rotation; the control circuit for the electric motor includes two limit switch contacts adapted to be opened by switching cams on a disk that moves proportional to the movement of the antenna, and a further switching contact which is adapted to be actuated by a further switching cam of the disk; the further switching contact is thereby opened at and above a predetermined extended length of the antenna while a manual switch with push-button function and possibly with detent function is provided for the further selective extension or retraction of the antenna.

19 Claims, 2 Drawing Figures

LOWERABLE ANTENNA FOR RADIO RECEIVERS

Figure 1:
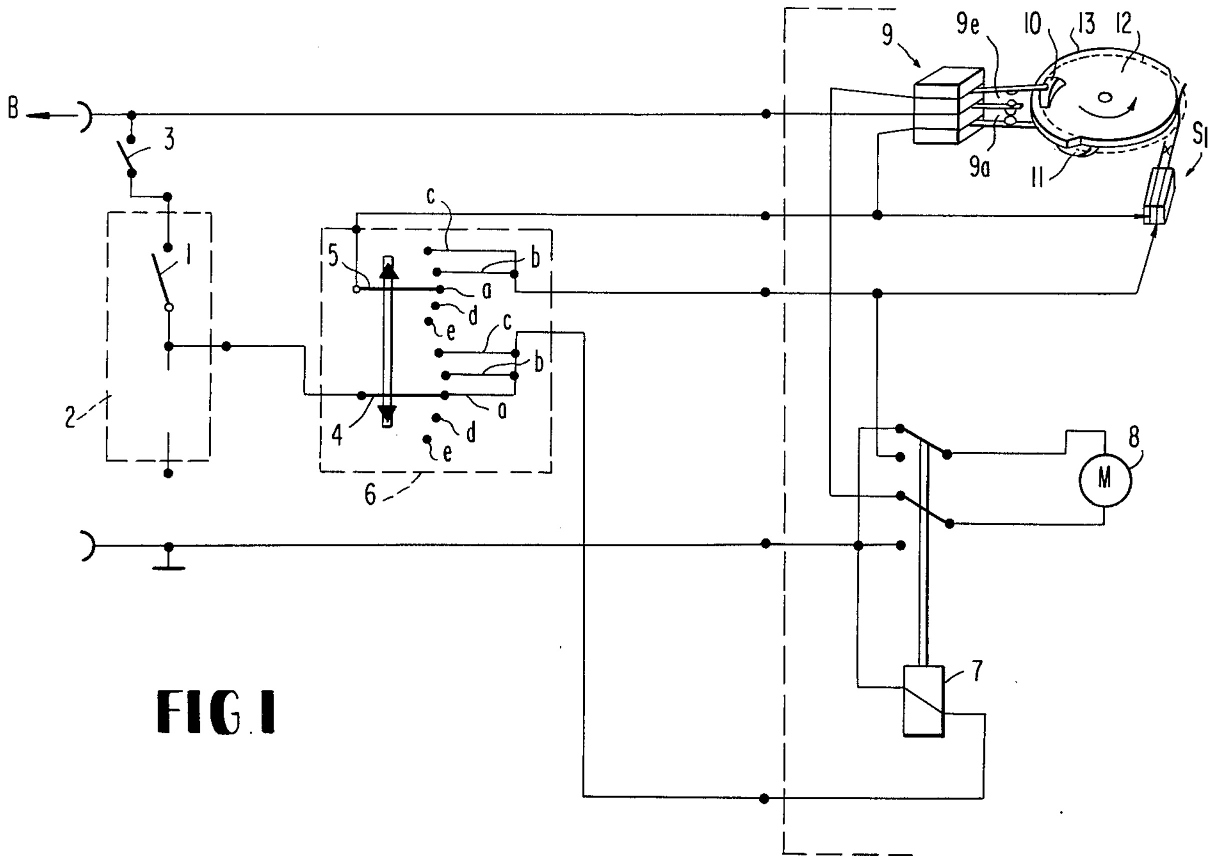

The present invention relates to an extensible and retractable antenna for radio receivers, especially for vehicles and especially with actuation by the on-off switch of the radio receiver, which is driven by an electric motor adapted to be reversed in its direction of rotation, to which are coordinated limit switch contacts and two switching cams provided on a disk moving proportionally with the antenna which actuate the limit switch contacts, and with at least one further switching cam for the interruption of the limit switch contact coordinated to the position of the antenna at a predetermined extended length of the antenna and with a push-button switch for bridging this limit switch contact.

Areas which are serviced by several radio transmitters that are spatially located close to one another do not always permit a completely satisfactory radio reception. As a result of the occurring high field strengths, non-linear distortions occur in the input and mixing stages of the receiver which lead to interfering and annoying cross modulations. In particular, the tuning operation in the radio receiver is rendered more difficult since the strong transmitter appears apparently at numerous places inside of the UKW (FM) tuning range.

A known remedial action against this problem resides in pushing-in the antenna to about half of its length. This can take place with simple antennas by hand or with so-called semi-automatic antennas by way of the manual switch. With fully automatic antennas actuated by the on-off switch of the radio receiver, this, however, is not possible since the same do not permit any intermediate position. An antenna is described in the German Gebrauchsmuster No. 7,217,473 which permits such a fixed intermediate position that can be bridged by a push button. The disadvantage of such a fixed predetermined intermediate position resides in the fact that only in the most rare cases is it matched to the respectively prevailing reception conditions. The same is also true for several predetermined intermediate positions.

It is the aim of the present invention to provide an antenna, in connection with which the extended length of the antenna that is optimum for the respectively received transmitter, is adjustable, whereby the antenna automatically extends into an intermediate position favorable for local transmitters, when turning-on the radio receiver, and thereupon can be further extended or retracted at will between this intermediate position and the fully extended position.

The underlying problems are solved according to the present invention in that the further switching cam is constructed as a cam plane and in that a further switching contact is provided which is actuated by the cam plane and is opened above a predetermined extended length of the antenna, and in that one manual switch each with push-button function and possibly with detent function is provided for the further selective extension or retraction of the antenna.

Accordingly, it is an object of the present invention to provide an extensible and retractable antenna for radio receivers which avoids by simple means the aforementioned shortcomings and drawbacks encountered in the prior art.

Another object of the present invention resides in an antenna for radio receivers adapted to be extended and retracted, which can be readily matched to optimum receiving conditions at a given time by selectively adjusting its effective length.

A further object of the present invention resides in an extensible and retractable antenna for radio receivers which can be selectively adjusted into any intermediate position matched to the tuning of the radio.

Still a further object of the present invention resides in a circuit arrangement for the control of the motor extending and retracting the antenna of a motor vehicle radio receiver which is simple in construction, reliable in operation and utilizes only relatively few parts and circuit connections.

Figure 2:
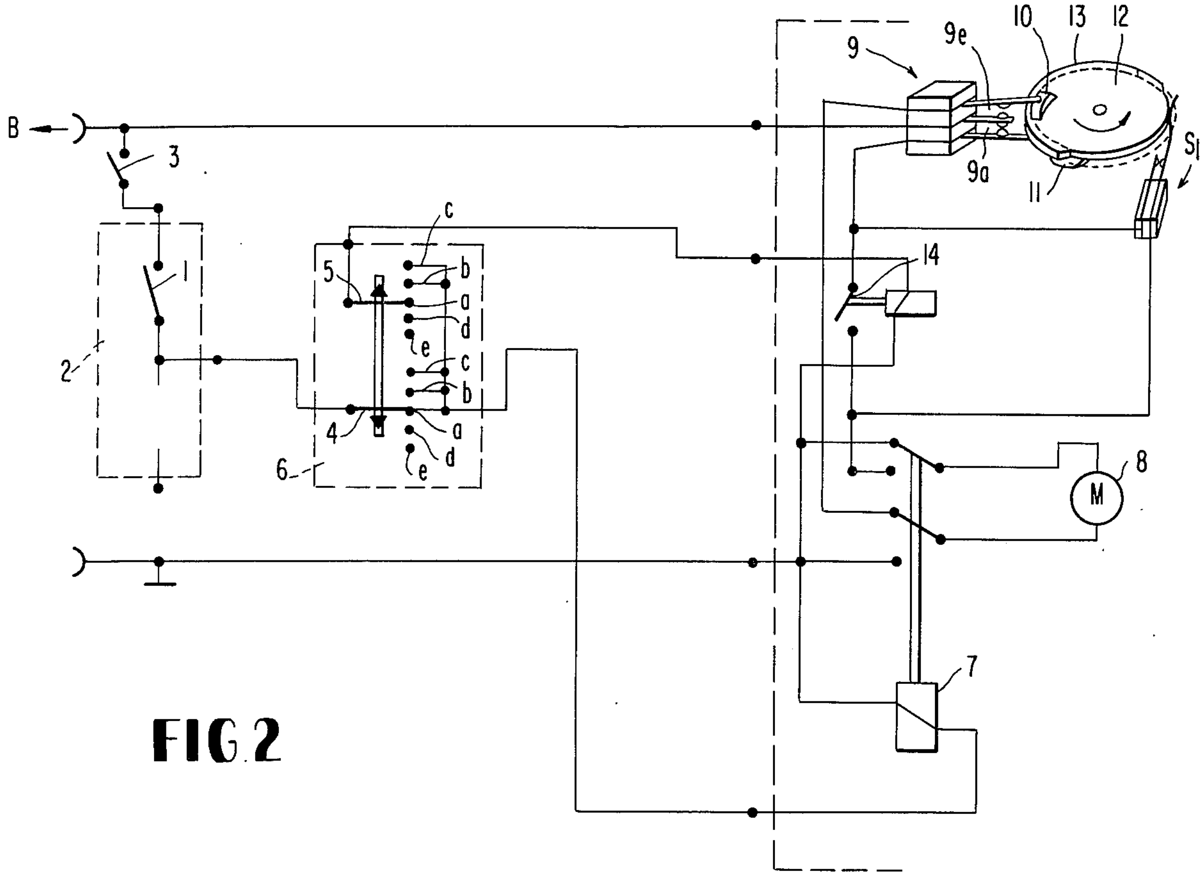

These and further objects, features and advantages of the present invention will become more apparent from the following description when taken in connection with the accompanying drawing which shows, for purposes of illustration only, two embodiments in accordance with the present invention, and wherein:

FIG. 1 is a schematic circuit diagram of a control circuit for an extensible and retractable antenna for radio receivers in accordance with the present invention; and FIG. 2 is a schematic circuit diagram of a modified embodiment of a control circuit for an extensible and retractable antenna for a radio receiver in accordance with the present invention.

Referring now to the drawing wherein like reference numerals are used throughout the two views to designate like parts, FIG. 1 illustrates the circuit of one embodiment in accordance with the present invention. The parts arranged to the right of the vertical dash line are located in the drive housing of the antenna. The motor switching relay 7 which is adapted to reverse the direction of rotation of the motor 8, receives current when turning on the receiver, by way of the on-off switch 1 of a radio receiver 2, which is connected with the positive terminal of the battery B by way of the ignition lock 3, and by way of the shifting or movable contact member 4 of the manual switch 6 disposed in the normal rest position *a*, and as a result thereof attracts its armature, thereby shifting its double-pole, double-throw contacts from the illustrated position corresponding to the de-energized condition of relay 7. As a result of the energization of the relay 7, the electric motor 8 receives current from the positive terminal of the battery B by way of the limit switch 9*a* and the further switching contact $S_1$ and thereby rotates in a direction of rotation so as to extend the antenna by means of a cable (not shown) or the like of conventional construction. Rotation of motor 8 in this direction also causes proportional rotation of disk 12 in the direction of rotation of the arrow. The limit switch 9 is thereby so constructed that with a completely retracted antenna—as illustrated—the contact 9*e* thereof is opened and with a completely extended antenna, the contact 9*a* thereof is opened by the cams 10 and 11, respectively.

In all intermediate positions of the disk or wheel 12, both contacts 9*a* and 9*e* are closed, i.e., are connected with the positive terminal B of the battery. These limit switch contacts 9*a* and 9*e* are actuated by cams 11 and 10 which are located on opposite sides of the switching wheel 12 rotating proportionally with the cable drum (not shown) for the antenna cable. During the extension out of the normal rest position into the fully extended position of the antenna, the switching wheel 12 carries out less than one complete rotation in the counterclockwise direction indicated by the arrow. Along a predetermined portion of its circumference, the shifting wheel 12 includes a raised portion 13 forming a camming plane, by means of which the further switching contact $S_1$ will be opened with a corresponding rotation of the switching wheel 12.

When turning on the radio receiver 2 by means of the on-off switch 1, the relay 7 is energized by way of a circuit including the ignition lock switch 3, the on-off switch 1 and the movable contact member 4 of the manual switch 6, which is in the normal rest position where it engages contact *a*, so that the motor 8 now receives current by way of the contacts 9*a* and $S_1$ and automatically extends the antenna. It thereby rotates the switching wheel 12 in the counterclockwise direction for such length of time until the switching contact $S_1$ is opened by the cam plane 13 and interrupts the motor energizing circuit. The antenna has thereby reached a predetermined extended length, for example, 30 centimeters, which is favorable for local transmitters. This predetermined length can now be changed at will by means of the manual switch 6 between this intermediate position and the fully extended length of the antenna—e.g. about 90 to 140 cm. depending on the construction. The contacts *b* and *d* of the shiftable contact members 4 and 5 of the manual switch which are coupled with each other, are the push-button contacts for the extension *b* and the retraction *d* of the antenna whereas the contacts *c* and *e* are the corresponding detent contacts. In other words, if the mutually coupled, movable contact members 4 and 5 are actuated to engage with the contact terminal *b* or *d*, then they will remain in such engagement only as long as the corresponding manual force is applied and will return to the normal rest position *a* thereof as soon as this manual force is removed. On the other hand, when manually actuated into the detent position *c* or *e*, the movable contact members 4 and 5 will remain in such detent position until the detent function is released again or manually overcome. Since the manual switch 6 is otherwise of conventional construction as to its mechanical details, a detailed description thereof is dispensed with herein for the sake of simplicity.

If the manual switch 6 is now actuated into the position *b*, e.g., by depressing the same, then the antenna continues to extend outwardly until the manual switch is again released or until the limit switch contact 9*a* opens when the antenna is in the completely extended position. If, in contradistinction thereto, the detent position *c* is engaged, in which the contact members 4 and 5 of the manual switch 6 will remain until the detent function is released or otherwise overcome, then the antenna will always extend to its full length, also when turning on the radio receiver by means of the on-off switch 1.

If the manual switch 6 is now actuated into the position *d*, then the antenna can be retracted up to the intermediate position, below which the further switching contact $S_1$ is closed. Though the antenna can also be completely retracted in this manner, it will be extended again when releasing the manual switch 6, which may be appropriately spring-loaded for that purpose, until the switch $S_1$ again opens. Only with an engaged manual switch 6 in the detent position *e* will the antenna remain retracted. This position is suitable when playing casettes or when driving through a car-wash installation.

When turning off the radio receiver by means of the on-off switch 1, the antenna will always be completely retracted automatically.

FIG. 2 illustrates a modification of the control circuit in accordance with the present invention, which differs from FIG. 1 only in that the bridging or parallel connection of the further switching contact $S_1$ does not take place by way of the contact member 5 of the manual switch 6, but by way of a relay contact 14 controlled by the manual switch 6. This offers two advantages: firstly, the operating current for the motor 8 is not conducted through the manual switch 6 and, secondly, one feed line to the antenna is economized.

A third double throw switch may additionally be provided in the manual switch 6, which receives current by way of the on-off switch 1 and closes the circuit in the positions (c) and (e) by way of an indicating lamp so as to indicate the detent positions.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An antenna operable to be extended and retracted for radio receivers, comprising actuating means for the antenna driven by an electric motor reversible in its direction of rotation, and control circuit means for the electric motor including an on-off switch operable to close the energizing circuit for the motor when turning on the receiver, limit switch means, and cam means moving in proportion to the movement of the antenna for actuating the limit switch means, characterized by a further cam means cooperating with a further switching contact means and operable to open the same above a predetermined extended length of the antenna, and manual switch means for the further selective extension or retraction of the antenna.

2. An antenna according to claim 1, characterized in that one manual switch means each is provided for the further selective extension and retraction of the antenna, respectively.

3. An antenna according to claim 2, characterized in that each manual switch means has a push-button function.

4. An antenna according to claim 3, characterized in that each manual switch means additionally has a detent function.

5. An antenna according to claim 4, characterized in that the further cam means is formed by a cam plane on a disk including said first-mentioned cam means which rotates in proportion to the movement of the antenna.

6. An antenna according to claim 2, characterized in that for the two manual switch means a common, rocker-type switch means with a push-button function in two opposite directions is provided.

7. An antenna according to claim 6, characterized in that said common, rocker-type switch means also has a detent function in two opposite directions.

8. An antenna according to claim 7, characterized in that the further switching contact means is connected in the circuit of the electric motor effecting the extension of the antenna.

9. An antenna according to claim 8, characterized in that a relay contact means actuated by the manual switch means is provided which is connected in parallel with the further switching contact means.

10. An antenna according to claim 9, characterized in that the manual switch means includes a lamp which lights up in the detent positions wih a turned-on radio receiver.

11. An antenna according to claim 10, characterized in that the antenna is a motor vehicle antenna, adapted to be automatically extended and retracted when turning on and off the radio receiver of the vehicle.

12. An antenna according to claim 1, characterized in that the manual switch means has a push-button function.

13. An antenna according to claim 12, characterized in that the manual switch means additionally has a detent function.

14. An antenna according to claim 1, characterized in that the further cam means is formed by a cam plane on a disk including said first-mentioned cam means which rotates in proportion to the movement of the antenna.

15. An antenna according to claim 1, characterized in that the further switching contact means is connected in the circuit of the electric motor effecting the extension of the antenna.

16. An antenna according to claim 1, characterized in that a relay contact means actuated by the manual switch means is provided which is connected in parallel with the further switching contact means.

17. An antenna according to claim 1, characterized in that the manual switch means includes a lamp which lights up in the detent positions with a turned-on radio receiver.

18. An antenna according to claim 1, characterized in that the control circuit means, in addition to the on-off switch, includes the manual switch means having a normal position in which the relay means is energized when the on-off switch is closed, the relay means having two contact members with two positions each, the relay contact members connecting one terminal of the electric power supply with the motor and the other terminal of the electric power supply with the other side of the motor by way of at least one of the limit switch means and the further switch means as long as the relay means is energized and the antenna is in a position below a predetermined extended position, and the relay contact members connecting the other side of the electric motor with said one terminal of the electric power supply and the one side of the electric motor with the other terminal of the electric power supply by way of a circuit including the limit switch means for the fully retracted position, which opens only in the fully retracted position, while the limit switch means for the fully extended position is closed in the fully retracted position and opens only in the substantially fully extended position.

19. An antenna according to claim 18, characterized in that the manual switch means includes a first movable contact member having at least two positions including the normal position and a push-button-type position in which the other terminal of the electric power supply is connected with one side of the energizing coil of the relay means whose other side is permanently connected with the other side of the electric power source, and a second movable contact having at least two positions including the normal position providing an open circuit and a second push-button-type position in which a circuit in parallel with the further switch means is operable to be closed.

* * * * *